UNITED STATES PATENT OFFICE.

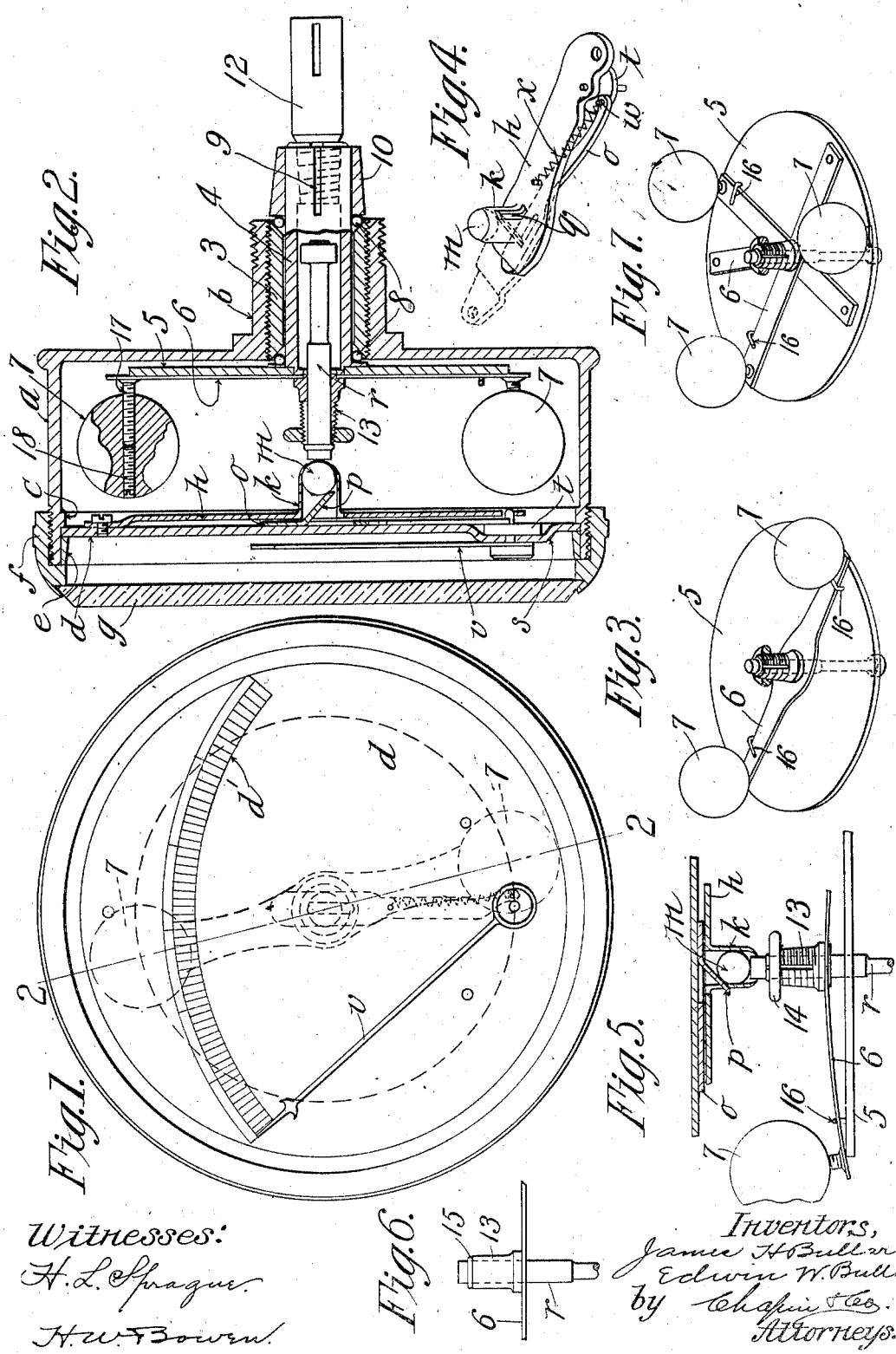

JAMES H. BULLARD AND EDWIN W. BULLARD, OF SPRINGFIELD, MASSACHUSETTS.

SPEEDOMETER.

967,168.  Specification of Letters Patent.  Patented Aug. 16, 1910.

Application filed January 18, 1908. Serial No. 411,410.

*To all whom it may concern:*

Be it known that we, JAMES H. BULLARD and EDWIN W. BULLARD, citizens of the United States of America, residing at Springfield, in the county of Hampden and State of Massachusetts, have jointly invented new and useful Improvements in Speedometers, of which the following is a specification.

This invention relates to indicators and has for its object the simplifying of the construction and the increase of accuracy of indicators.

The invention consists in the construction and arrangement whereby the objects of our invention are attained.

In the present embodiment of our invention, we show a construction adapted for indicating the surface or circumferential speed or travel of a rotating member, such as a wheel.

Referring now to the details of construction of the present embodiment of our invention as shown in the accompanying drawings,—Figure 1 is a face view of an instrument showing in dotted lines the rotating arm and its weights, and connections between the axis of this arm and the indicating pointer. Fig. 2 is a vertical section taken through the axis of the instrument on the line 2—2, Fig. 1,—certain of the parts being shown in elevation. Fig. 3 is a perspective view on a reduced scale of the rotating arm, its weights, and a support for said arm, and adjusting means for the centrally located spindle actuated by centrifugal force whereby movement is communicated to the indicating pointer. Fig. 4 is a perspective view of mechanism secured to the underside of the dial plate, but removed therefrom, by means of which the indicating pointer is actuated. Fig. 5 is a sectional view of certain parts of the instrument shown in Fig. 2 but in a different position. Fig. 6 is a detached view of a part of the axially located spindle, shown in Fig. 2, but showing a somewhat modified construction in place of the adjusting devices for said spindle, as illustrated in said Figs. 2 and 5. Fig. 7 is a perspective view of a modification of the construction shown in the other figures of the drawing.

Referring now in detail to the drawings: $a$ indicates the case of the instrument which is in the form of a shallow cup open at one side and having an axially located hub $b$ on the closed side thereof. Near the edge of the open side of the case a bead $c$ is turned up on the inside thereof to support a dial plate $d$ which is held in position by means of a ring $e$ held securely against the edge of the plate by a screw-cap comprising the metal ring $f$ and a glass face $g$.

On the under side of the dial plate $d$ is secured a metal bridge plate $h$ (shown in Fig. 4 in perspective and clearly indicated also in Figs. 2 and 5) which has struck up therefrom, or affixed thereto, the hub $k$ which, when the plate is in position, will be located axially in line with the axis of the hub $b$ on the case; and in this hub $k$ is a ball $m$ which may play freely therein and is held in the hub by "spinning" over the open end of the latter. When the bridge-plate $h$ is in position on the under side of the dial-plate $d$ space is provided between the two for the slidable arm $o$ having a tongue $p$, preferably struck up therefrom, and of such dimension as to lie within the hub $k$ at an angle of about 45 degrees, the side of the hub $k$ having a vertically disposed opening $q$ therein to permit this tongue to move through it when, by pressure applied on the ball $m$, the latter is forced against the inclined tongue $p$ to impart endwise movement to the slidable member $o$, such movement of the ball $m$ being effected by the endwise movement of the axially located spindle $r$ in a manner to be described.

At the proper point in the dial plate $d$, a depression $s$ is formed therein to receive the hub $t$ of the indicating pointer $v$; and, as shown in Fig. 4, eccentrically of this hub is a pin $w$ with which the end of the sliding member $o$ engages whereby endwise movement of the slide toward and from the hub $t$ will impart a swinging movement to the indicating pointer over the face of the dial. The pin $w$ is made long enough so that its free end will extend beyond the bridge-plate $h$, and to the upper end of this pin a spring $x$ is attached whose opposite end is secured to another pin on the bridge-plate, the spring being normally under slight tension to the end that the tongue $p$ on the arm $o$ may always press the ball $m$ toward or against the end of the spindle $r$; and this pressure being in a direction contrary to the direction of movement of the spindle when it actuates the pointer, all possibility of "play" or lost motion of the pointer is therefore eliminated when the instrument is in operation.

The construction of the devices whereby movement is imparted to the indicating pointer is as follows: In the hub $b$ of the casing, is screwed a sleeve 3, each end of which is inwardly beveled, as shown in Fig. 2; within this sleeve is a hollow spindle 4 to the inner end of which is secured the disk 5, (shown in perspective in Fig. 3) which constitutes a support for the spring arm 6 and the weights 7 that are mounted on the opposite ends thereof. The spindle 4 is supported in the sleeve 3 by means of a row of balls 8 at each end of the sleeve, the balls at the inner end resting against the beveled inner end of the sleeve, and a suitable bearing ring on the under side of the disk 5. The outer end of the spindle 4 extends beyond the end of the sleeve and is split, as at 9, and over this split end of the spindle is forced a sleeve 10, the inner end of which constitutes a bearing for the balls lying between said end and the outer end of the sleeve 3. The outer end of the spindle 4 is turned out slightly tapering and is screw-threaded to receive the similarly tapered and threaded end of the member 12 which, when screwed into the end of the spindle 4, will expand it, thus binding the sleeve 10 thereon. This construction permits the easy assembling and adjustment of the spindle 4 and the disk 5 carried thereby, as when the balls are in position, the sleeve 10 can be pushed over the outer end of the spindle to attain just the required adjustment of the latter to permit it to rotate freely without end play; whereupon the member 12 can be screwed into the end of the spindle to maintain this adjustment. This member 12 is that to which the flexible shaft is connected, whereby the instrument is actuated.

It is immaterial whether the disk 5 be in the form of a disk or simply a straight supporting arm lying underneath the spring-arm 6; but preferably this member is made in the form of a disk, as shown. The arm 6 is made of thin spring steel having a centrally located hole therein through which the spindle $r$ extends. This spindle is held in contact with the ball $m$ either by means of a long collar (such as is shown in Figs. 2, 3, and 5) indicated by 13, or by means of the construction shown in Fig. 6, which will be hereinafter referred to. In the construction shown in Fig. 2 this collar is split and externally tapered and threaded and provided with a nut 14 screwing down over said tapered end whereby the spindle $r$, after being properly adjusted relative to the ball $m$, may be held in said collar by compression. As shown in Fig. 5 more particularly, it will be seen that the lower end of the collar extends through the spring arm 6 and is secured thereto in any suitable way, preferably by "spinning" the protruding part of the collar over the edge of the hole through the spring whereby the collar will move with the spring.

If desired, instead of making the collar 13 as hereinbefore described, it may be made as shown in Fig. 6 in which it is designated by the same numeral. In this construction, the collar is not split and is secured to the spring-arm 6, as in the other construction and the spindle $r$ is provided with an annular flange 15 near the upper end thereof whereby a shoulder is formed to support it on the end of the collar 13 and the latter is left a little longer than required. Then, in assembling the instrument, the top of the collar 13 may be cut down to bring the upper end of the spindle $r$, when in assembled position, just at that point required to bring the pointer $v$ to the zero mark on the scale $d^1$ of the dial.

To insure the rotation of the spring-arm 6 and the weights 7 carried thereby, pins 16 are located in the disk 5 or in whatever form of support is provided for the spring-arm 6; these pins 16 being located as close to the balls as possible, the upper ends thereof being bent out over the upper surface of the arm whereby, if the instrument is reversed, as in shipping it might be, the weight of the balls will not be borne by the arm $o$ which is connected with the indicating pointer. Preferably, a pin of this kind is located on opposite sides of the arm 6—one near each ball,—this being shown in Fig. 3.

The balls 7, preferably are mounted on the arms 6 adjustably, whereby, by increasing or diminishing the distance of the ball beyond the plane of the arm, the center of the arm may be sprung up more or less when rotating at a given rate of speed, it being obvious that the more nearly the center of the balls approaches the plane of rotation of the arm 6 the less will be the bowing effect of said arm during the rotation thereof. Any means may be employed to lock the balls in their adjusted position above the plane of the arm 6,—one method being shown herein in Fig. 2 which consists in securing a pin 17 in the ends of the arm and screwing the balls onto these pins, and when they are adjusted to the proper position thereon, introducing a screw 18 into a hole in the opposite side of the ball and turning it down against the end of the pin 17. If desired, however, the balls may be permanently fixed to the ends of the arm 6 in any desirable way and the requisite flexibility of the same arm under a given speed of rotation may be attained by grinding off the arm on one side thereof to render it more flexible, the grinding of course taking place, preferably, near and on either side of the center thereof.

It will be observed that the ends of the spring-arm 6 extend slightly beyond the edge of the disk 5 whereby, during the rotation of the arm, as the weights 7 tend to swing over into the plane of rotation of the arm, the edge of this disk 5 becomes the fulcrum whereby owing to the tendency of the weights referred to, the central portion of the arm will be sprung out at right angles to the plane of its rotation. This device would be entirely operative, however, if the ends of the spring-arm did not extend beyond the edge of the disk 5 but such a construction would be less sensitive.

By the construction of a speedometer mechanism as above described, an instrument of the utmost simplicity of construction is provided, and as well an instrument whose function will be the same under all circumstances, as there are no jointed parts whereby any lost motion may result either from carelessness of manufacture or from wear, and by properly proportioning the spring-arm relative to the weight it is to carry, and the position of the weights relative to the plane of rotation of the arm, an instrument of great sensitiveness is provided. Furthermore, the indicating pointer $v$ will move steadily over the scale in either direction for the reason that from the point of beginning its movement at zero, toward the other end of the scale and back again, the spring $x$ tends always to press the ball $m$ lightly against the end of the spindle $r$, and when the instrument is in operation, the spindle is, by the bowing up of the spring-arm, as shown in Fig. 5, likewise yieldingly held against the other side of the ball, and there is thus at no point of the movement of the indicator arm any relaxation of the light, yielding contact of the ball $m$ with the inclined tongue $p$ of the arm $o$ on one side and the inner end of the spindle $r$ on the other side, this being true even when the pointer is at rest from the fact that the spring $x$ is normally under some strain.

We are aware that rotary flexible arms, carrying weights between the ends, have been employed, in old styles of governors in use many years ago, to transmit motion and power at or from the ends as the cords of such arms are lengthened and shortened under the centrifugal influence of the balls, and do not seek to cover by our claims such a construction.

The construction shown in Fig. 7 of the drawings is a legitimate modification of that shown in the other figures and is entirely within the scope of the invention, and it consists in the use of three arms 6 spaced at 120°, each arm having a perforation therein, through which the center spindle $r$ may pass loosely one end of each of the arms being secured to the support 5, the opposite end having the weight 7 secured thereto as in the other figures of the drawing. The three arms arranged as described will operate precisely in the same manner as the construction shown in Fig. 3, to impart endwise movement to the spindle $r$, it being necessary of course to slightly elongate the hole through these spring arms at the point where the spindle passes through them in order to permit the central portion thereof to be bowed upwardly, as shown in Fig. 5, without binding on the spindle.

What we claim, is:—

1. In a speedometer, indicating means therefor means to actuate the indicating mechanism consisting of a flexible arm rotatably supported between its ends, means for supporting said arm, and a weight secured to the end thereof outside the plane of rotation of the arm when unflexed and constituting with the latter an elbow lever, means to rotate the arm, connecting means between the arm and the indicating mechanism whereby, through centrifugal action, the weight will flex the arm to impart movement to the indicating mechanism.

2. In a centrifugally actuated speedometer, an indicating mechanism, means to actuate the same comprising a one-piece flexible arm having weighted ends and rotatably supported between its ends, means whereby centrifugal action exerted on said ends during the rotation of the arm will effect the flexure of the arm between its ends, said last-mentioned means comprising a suitable fulcrum for, and having the same axis as, the arm.

3. An indicating device comprising a suitable pivotally mounted support, a flexible member extending across the axis of and pivotally mounted to revolve with said support and free to move axially, a weight on the flexible member outside the center of revolution whereby a portion of the flexible member is moved axially by the force exerted thereon by changes of the speed of its revolution, an indicator, and operative mechanism between the flexible member and the indicator whereby the changes of the position of the flexible member caused by the varying speed of revolution are shown by the indicator, and means to revolve said support for the flexible member.

4. In a centrifugally actuated speedometer, an indicating mechanism, means to actuate the same comprising a flexible arm rotatably supported between its ends, a suitable fulcrum engaged by the arm, a weight on the end portion of the arm with its center on one side of the latter, whereby during its rotation the arm will be flexed in a plane passing through the axis of the supporting means.

5. A speedometer comprising indicating mechanism, a spring arm rotatably supported between its ends, a support for the arm having the same axis as the latter and rotatable therewith, and a suitable weight supported on each end of the arm, means to rotate the support and arm whereby through the centrifugal action of the weights, the center of said arm will be sprung out of the plane of the ends of the arm, and means in operative relation to said spring-arm to impart movement to said indicating mechanism.

6. A speedometer comprising a suitable casing, a spring-arm in the casing rotatably supported between its ends, and a support for the arm, rotatable therewith, and weights secured to the opposite ends of the arm, one side of the plane of rotation of the latter; means to rotate the arm whereby the centrifugal action of the weights will effect the springing out of the arm at the axis thereof, at right angles to the plane of its rotation when unflexed, a dial in the casing, a pointer to move over the face thereof, and suitable connections between the hub of the pointer and the axis of the spring-arm whereby the spring action of the latter will impart movement to the pointer.

7. A speedometer comprising a spring-arm rotatably supported between its ends, a supporting element for the arm rotatable therewith and constituting a fulcrum for the free ends of the arm; weights on the ends of the arm located outside the plane of rotation of the latter, whereby the rotation of the arm will effect the springing out of the center thereof at right angles to the plane of its rotation when unflexed, and a suitable indicating device actuated by the movement of the central part of the arm.

8. In an indicator, a suitable case, a hub or guide for a ball, a dial, a pointer on the dial, a sliding member in operative connection with the pointer, the sliding member having an angular offset extending into said hub, a ball in said hub bearing against the offset, and means to move the ball.

9. A centrifugally actuated speedometer comprising a one-piece flexible arm, means for rotatably supporting and constituting a fulcrum for the same between its ends, said ends having weights thereon whereby the rotation of the arm will effect the flexure thereof between its ends in a direction at right angles to the plane of its rotation when unflexed, together with an indicating mechanism comprising an indicating pointer, a slidable member to effect the oscillation of the pointer and having an inclined plane thereon, means whereby the flexure of said arm may be directed against said inclined plane to move the slide, and means whereby the slidable member effects the oscillation of the pointer.

JAMES H. BULLARD.
EDWIN W. BULLARD.

Witnesses:
K. I. CLEMONS,
HARRY W. BOWEN.